United States Patent
Bar Yanai et al.

(10) Patent No.: US 12,316,694 B2
(45) Date of Patent: *May 27, 2025

(54) MAXIMUM SUSTAINABLE ENCODING BIT RATES FOR VIDEO DOWNLOADS

(71) Applicant: Vasona Networks, Inc., Austin, TX (US)

(72) Inventors: Roni Bar Yanai, Even-Yehuda (IL); Ofer Weill, Modiin (IL); Vijay Devarapalli, Los Altos, CA (US)

(73) Assignee: Vasona Networks, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,743

(22) Filed: Jun. 30, 2023

(65) Prior Publication Data
US 2023/0353623 A1    Nov. 2, 2023

Related U.S. Application Data

(63) Continuation of application No. 17/349,593, filed on Jun. 16, 2021, now Pat. No. 11,729,241, which is a
(Continued)

(51) Int. Cl.
*H04L 12/26* (2006.01)
*H04L 47/22* (2022.01)
(Continued)

(52) U.S. Cl.
CPC .......... *H04L 65/765* (2022.05); *H04L 47/225* (2013.01); *H04L 47/38* (2013.01);
(Continued)

(58) Field of Classification Search
CPC ....... H04L 29/06; H04L 65/605; H04L 67/22; H04L 29/08; H04N 21/238;
(Continued)

(56) References Cited

U.S. PATENT DOCUMENTS

| | | | |
|---|---|---|---|
| 8,135,852 B2 * | 3/2012 | Nilsson ............ | H04N 21/23424 709/236 |
| 10,051,519 B2 * | 8/2018 | Gopalan ................. | H04L 47/30 |

(Continued)

OTHER PUBLICATIONS

Notice of Allowance mailed on Mar. 30, 2023, filed in U.S. Appl. No. 17/349,593, pp. 1-4.
(Continued)

*Primary Examiner* — Frank Duong

(57) ABSTRACT

Described embodiments include a system that includes a network interface and a processor. The processor is configured to identify, via the network interface, a state of congestion in a communication channel between a base station belonging to a cellular network and a client device, to calculate, responsively to the state of congestion, a maximum sustainable encoding bit rate (MSEBR) for a video that is being downloaded by the client device, from a server, via the communication channel, the video being encoded at a plurality of different predefined bit rates, and to inhibit the client device, in response to calculating the MSEBR, from downloading a segment of the video that is encoded at any one of the predefined bit rates that exceeds the MSEBR. Other embodiments are also described.

16 Claims, 2 Drawing Sheets

Related U.S. Application Data continuation of application No. 16/413,827, filed on May 16, 2019, now Pat. No. 11,070,605, which is a continuation of application No. 15/480,396, filed on Apr. 6, 2017, now Pat. No. 10,298,650.

(60) Provisional application No. 62/324,932, filed on Apr. 20, 2016.

(51) Int. Cl.

| | | |
|---|---|---|
| *H04L 47/38* | (2022.01) | |
| *H04L 65/75* | (2022.01) | |
| *H04L 67/01* | (2022.01) | |
| *H04L 67/50* | (2022.01) | |
| *H04L 69/40* | (2022.01) | |
| *H04N 21/234* | (2011.01) | |
| *H04N 21/238* | (2011.01) | |
| *H04N 21/258* | (2011.01) | |
| *H04N 21/61* | (2011.01) | |
| *H04N 21/647* | (2011.01) | |
| *H04N 21/6583* | (2011.01) | |
| *H04W 28/02* | (2009.01) | |
| *H04W 48/06* | (2009.01) | |
| *H04L 47/32* | (2022.01) | |

(52) U.S. Cl.
CPC ............ *H04L 67/01* (2022.05); *H04L 67/535* (2022.05); *H04L 69/40* (2013.01); *H04N 21/23406* (2013.01); *H04N 21/23805* (2013.01); *H04N 21/25808* (2013.01); *H04N 21/6131* (2013.01); *H04N 21/64738* (2013.01); *H04N 21/6583* (2013.01); *H04W 28/0284* (2013.01); *H04W 48/06* (2013.01); *H04L 47/32* (2013.01)

(58) Field of Classification Search
CPC ........... H04N 21/23805; H04N 21/258; H04N 21/25808; H04N 21/61; H04N 21/6131; H04N 21/647; H04N 21/64738; H04N 21/6583; H04W 28/02; H04W 28/0284; H04W 48/06
See application file for complete search history.

(56) References Cited

U.S. PATENT DOCUMENTS

| | | | |
|---|---|---|---|
| 10,065,922 B2 * | 9/2018 | Stevens | C07D 498/04 |
| 10,356,652 B2 * | 7/2019 | Ma | H04L 47/24 |
| 10,367,738 B2 * | 7/2019 | Szilagyi | H04W 24/02 |
| 2012/0005361 A1 * | 1/2012 | Knittle | H04N 21/2662 709/231 |
| 2013/0163430 A1 * | 6/2013 | Gell | H04N 21/6131 370/235 |
| 2017/0070781 A1 * | 3/2017 | Bar Yanai | H04N 21/44008 |

OTHER PUBLICATIONS

Terminal Disclaimer Approved on Feb. 21, 2023, filed in U.S. Appl. No. 17/349,593, p. 1.
Terminal Disclaimer Filed on Feb. 21, 2023, filed in U.S. Appl. No. 17/349,593, pp. 1-3.
Response to Non-Final Office Action dated Feb. 21, 2023, filed in U.S. Appl. No. 17/349,593, pp. 1-5.
Non-Final Office Action mailed Oct. 20, 2022, filed in U.S. Appl. No. 17/349,593, pp. 1-11.

* cited by examiner

MAXIMUM SUSTAINABLE ENCODING BIT RATES FOR VIDEO DOWNLOADS

CROSS-REFERENCE TO RELATED APPLICATIONS

The present application claims the benefit of U.S. Provisional Appl. No. 62/324,932, filed Apr. 20, 2016, whose disclosure is incorporated herein by reference.

FIELD OF THE INVENTION

The present invention relates to the field of cellular communication, and specifically to the downloading of content, such as video content, over a cellular network.

BACKGROUND

Adaptive Bit Rate (ABR) is a multimedia streaming technique in which multimedia content is streamed to a client in segments, typically of equal duration, that may differ from each other in their respective encoding bit rates. Typically, when requesting a segment, the client specifies an encoding bit rate from a plurality of predefined bit rates, and the server then streams the requested segment having the specified encoding bit rate to the client. ABR can be used over various communication protocols, such as Hyper-Text Transfer Protocol (HTTP) and HTTP-Secure (HTTPS).

To avoid any confusion, it is important to distinguish between "encoding bit rate" and "communication bit rate." The term "encoding bit rate" refers to the bit rate at which the media (e.g., video) content provided to the client is encoded. Generally, a high encoding bit rate corresponds to high media quality, and vice versa. The term "communication bit rate," on the other hand, refers to the bit rate at which the media is downloaded by the client. The communication bit rate is not necessarily related to the encoding bit rate. For example, for a given encoding bit rate, the communication bit rate may vary, depending on the conditions of the communication channel to the client. (It is noted that the present application also refers to a "streaming bit rate," the rate at which the video is streamed from the server, which may be greater than the communication bit rate.)

Jain, A. et al., Mobile Throughput Guidance Inband Signaling Protocol, IETF Internet Draft, Sep. 7, 2015, which is incorporated herein by reference, proposes a mechanism and protocol elements that allow a cellular network to provide near real-time information on capacity available to the TCP server. This "Throughput Guidance" (TG) information would indicate the throughput estimated to be available at the radio downlink interface (between the Radio Access Network (RAN) and the mobile device (UE)). The TCP server can use this TG information to ensure high network utilization and high service delivery performance. The document describes the applicability of the proposed mechanism for video delivery over cellular networks; it also presents test results from a live operator's environment.

SUMMARY OF THE INVENTION

There is provided, in accordance with some embodiments of the present invention, a system that includes a network interface and a processor. The processor is configured to identify, via the network interface, a state of congestion in a communication channel between a base station belonging to a cellular network and a client device. The processor is further configured to calculate, responsively to the state of congestion, a maximum sustainable encoding bit rate (MSEBR) for a video that is being downloaded by the client device, from a server, via the communication channel, the video being encoded at a plurality of different predefined bit rates. The processor is further configured to inhibit the client device, in response to calculating the MSEBR, from downloading a segment of the video that is encoded at any one of the predefined bit rates that exceeds the MSEBR.

In some embodiments, the processor is configured to inhibit the client device from downloading the segment by causing the client device to download a different segment of the video that is encoded at a highest one of the predefined bit rates that does not exceed the MSEBR.

In some embodiments, the processor is configured to identify the state of congestion by ascertaining a number of bytes of streamed content destined for the client device that were not yet acknowledged by the client device.

In some embodiments, the processor is configured to calculate the MSEBR based on historical communication bit rates at which the video was downloaded, via the communication channel, by the client device.

In some embodiments, the processor is configured to calculate the MSEBR as a weighted average of (i) a most recent MSEBR, which is based on the historical communication bit rates, and (ii) a quantity based on an estimated current communication bit rate at which content is being downloaded by the client device.

In some embodiments, the processor is further configured to estimate the current communication bit rate, based on an estimated number of bytes of content that were received by the client device during a preceding period of time.

In some embodiments, the MSEBR is a first MSEBR, and the processor is further configured:
to estimate, subsequently, a current communication bit rate at which content is being downloaded by the client device;
to calculate a second MSEBR, responsively to the estimated current communication bit rate exceeding the first MSEBR by more than a threshold; and
to apply the second MSEBR to the downloading of the video, by inhibiting the client device from downloading a segment of the video that is encoded at any one of the predefined bit rates that exceeds the second MSEBR.

In some embodiments, the processor is further configured to cause the communication bit rate to exceed the first MSEBR by more than the threshold, by controlling the communication bit rate.

In some embodiments, the processor is configured to inhibit the client device from downloading the segment by controlling a communication bit rate at which the client device downloads content, such that the client device refrains from requesting the segment from the server.

In some embodiments, the processor is configured to control the communication bit rate by:
receiving streamed packets en-route to the client device, and
releasing the packets, to the client device, such as to achieve a desired communication bit rate.

In some embodiments, the processor is configured to inhibit the client device from downloading the segment by communicating the MSEBR to the client device, such that the client device refrains from requesting the segment from the server.

There is further provided, in accordance with some embodiments of the present invention, a system that includes a network interface and a processor. The processor is configured to calculate a default maximum sustainable encoding bit rate (MSEBR) for a base station belonging to a cellular network, based on historical communication bit rates at which content was downloaded via the base station by a plurality of devices. The processor is further configured to identify, via the network interface, that a client device is requesting to download a video, from a server, via the base station, the video being encoded at a plurality of different predefined bit rates. The processor is further configured to inhibit the client device, in response to the identifying, from downloading a segment of the video that is encoded at any one of the predefined bit rates that exceeds the default MSEBR.

In some embodiments, the processor is configured to inhibit the client device from downloading the segment by causing the client device to download a different segment of the video that is encoded at a highest one of the predefined bit rates that does not exceed the default MSEBR.

In some embodiments, the processor is configured to inhibit the client device from downloading the segment in response to the client device having switched to the base station while downloading the video.

There is further provided, in accordance with some embodiments of the present invention a method. The method includes, using a processor, identifying a state of congestion in a communication channel between a base station belonging to a cellular network and a client device. The method further includes, responsively to the state of congestion, calculating a maximum sustainable encoding bit rate (MSEBR) for a video that is being downloaded by the client device, from a server, via the communication channel, the video being encoded at a plurality of different predefined bit rates. The method further includes, in response to calculating the MSEBR, inhibiting the client device from downloading a segment of the video that is encoded at any one of the predefined bit rates that exceeds the MSEBR.

There is further provided, in accordance with some embodiments of the present invention, another method. The method includes, using a processor, calculating a default maximum sustainable encoding bit rate (MSEBR) for a base station belonging to a cellular network, based on historical communication bit rates at which content was downloaded via the base station by a plurality of devices. The method further includes identifying that a client device is requesting to download a video, from a server, via the base station, the video being encoded at a plurality of different predefined bit rates. The method further includes, in response to the identifying, inhibiting the client device from downloading a segment of the video that is encoded at any one of the predefined bit rates that exceeds the default MSEBR.

The present invention will be more fully understood from the following detailed description of embodiments thereof, taken together with the drawings, in which:

DETAILED DESCRIPTION OF EMBODIMENTS

Overview

Figure 1:
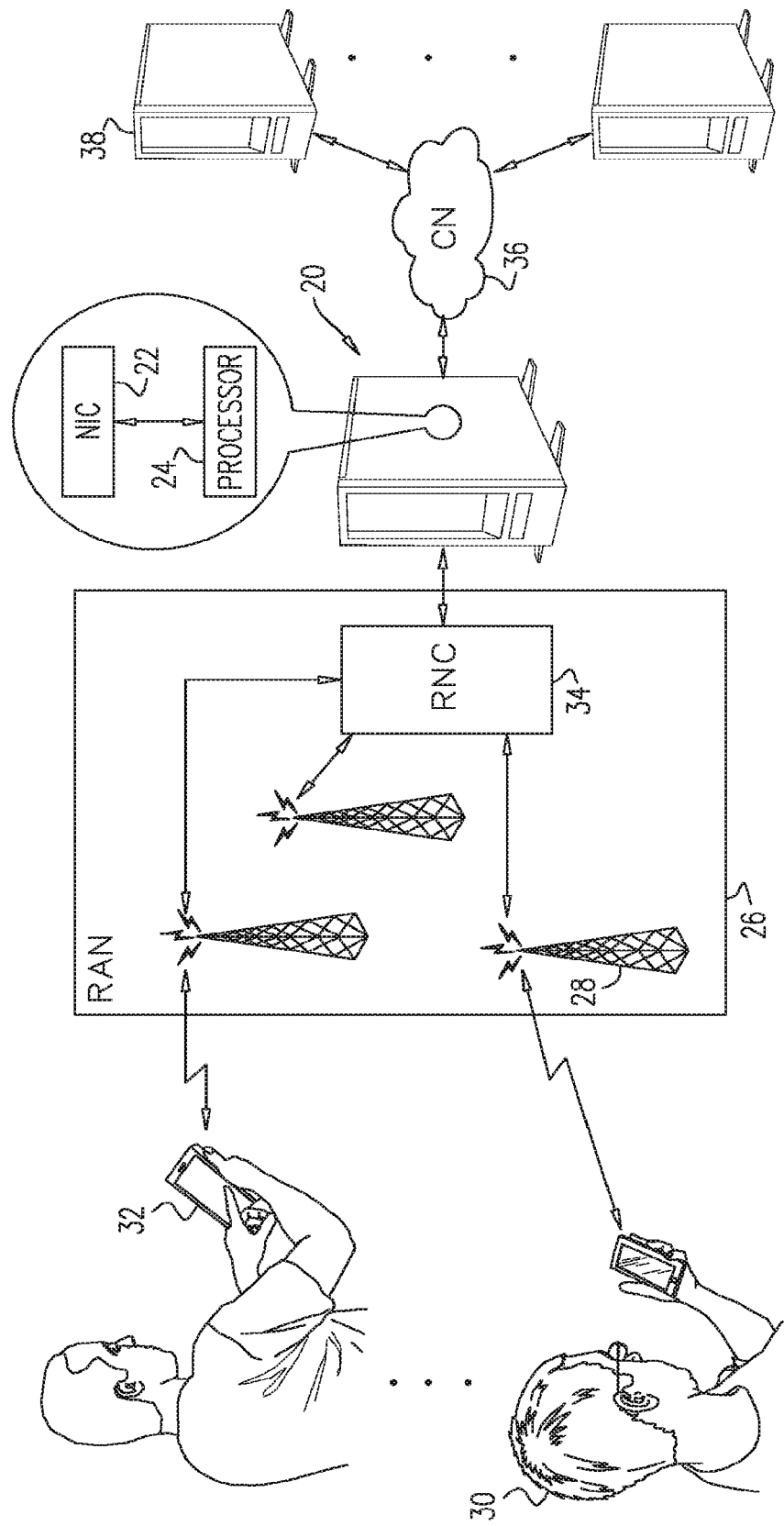
FIG. 1 is a schematic illustration of a system for managing the downloading of video content over a cellular network, in accordance with some embodiments of the present invention.

Embodiments of the present invention provide systems and methods for providing a better user experience in ABR streaming of video content over cellular networks, such as Universal Mobile Telecommunications Service (UMTS) and Long Term Evolution (LTE) networks.

In ABR video streaming, each segment of video is encoded at several predefined bit rates. For example, each segment may be encoded at 300 kbps, 700 kbps, 1 Mbps, and 1.4 Mbps. Upon receiving a download request from a client device (or "client"), the video server streams the video to the client, segment-by-segment. Typically, the client requests each new segment by sending, to the server, a GET message, in which the client specifies the number of the segment, along with a particular encoding bit rate. The server, upon receiving the GET message, selects the segment having the requested number and encoding rate, and then sends this segment to the client.

The client stores each downloaded segment of video in the client's buffer, and, as the video is played, the downloaded content is drawn from the buffer. If the downloading of new content does not keep pace with the playback, the buffer becomes empty, and a stall in the playback occurs.

Typically, the client selects the desired encoding bit rate responsively to the state of the buffer, which, in turn, generally indicates the state of the communication channel between the server and the client. For example, if the buffer is empty, or nearly empty, e.g., due to limitations in channel bandwidth or otherwise poor channel conditions, the client may request a lower encoding bit rate, in order to facilitate a faster downloading of content. For example, if the client was downloading segments encoded at 1 Mbps, but the buffer became empty, the client may request a lower encoding bit rate of, for example, 700 kbps. Conversely, if the buffer is full, the client may request a higher encoding bit rate.

Similarly, the client may select the desired encoding bit rate responsively to the rate at which a requested segment of video was downloaded. For example, if the client sees that a particular segment was downloaded relatively quickly, the client may request that the same segment be streamed to the client again, at a higher encoding bit rate.

Generally, there are several drawbacks to traditional ABR techniques, particularly when these techniques are implemented in cellular networks:

(i) Upon starting to download a video, the client does not yet know the most suitable encoding bit rate to request. Consequently, the client may try several different encoding bit rates, before settling on the most suitable encoding bit rate. This initial trial period may cause the user's viewing experience to be compromised. In particular, if the client plays the video during the trial period, the user may be disturbed by the frequent changes in video quality; if the client does not play the video, the user may be disturbed by the long start delay.

(ii) In cellular networks, short-term changes in communication-channel conditions frequently occur, e.g., due to changes in the number of clients utilizing the cell. (It is noted that a change in the number of client utilizing a cell may have a large impact on the bandwidth available to each client, if, as is typically the case, the number of clients utilizing the cell is small.) Such a change may, in turn, cause a short-term change in the download rate, or in the state of the buffer of the client, such that the client requests a different encoding bit rate. Subsequently, however, the client may not react quickly enough when the communication channel reverts to its previous state. As a result, the communication channel may be underutilized, such that the video quality is unnecessarily poor, or overutilized, such that stalls in the playback are experienced. Moreover, even if the client reacts to the reversion in channel conditions by requesting the previous encoding bit rate, the user's viewing experience may be compromised, due to the frequent changes in video quality.

(iii) Since the client typically does not know the level of congestion in the communication channel between the base station and the client, the client may not necessarily request the most appropriate encoding bit rate. For example, even if the communication channel is not congested, the client may, in some cases, request a lower encoding bit rate.

(iv) The cells within a network may vary from each other with respect to the bandwidth that is available for utilization. Hence, upon moving to a new cell, a client may experience a drop in available bandwidth, such that a stall in playback is experienced before the client realizes the need to request a lower encoding bit rate. Conversely, the client may continue to download video at a lower encoding bit rate for some time, despite more bandwidth being available in the new cell.

To overcome these problems, embodiments of the present invention provide a system that calculates a maximum sustainable encoding bit rate (MSEBR) for each video download, and then inhibits the client device from downloading segments of the video encoded at an encoding bit rate that exceeds the MSEBR. In particular, typically, the system causes the client to download segments of the video encoded at the highest encoding bit rate that is less than the calculated MSEBR. The MSEBR is based on both current and historical activity, is specific to the cell in which the video is downloaded, and may take into account the activity of other clients within the cell. Moreover, the MSEBR is typically lowered only if the communication channel between the base station and the client is congested. As a result, each of the above drawbacks is overcome, as follows:

(i) The client may be able to forego the initial trial period, and immediately begin downloading at the encoding bit rate implied by the calculated MSEBR. Even if the client was not recently active, an appropriate MSEBR may be calculated for the download, based on the current and historical activity of other clients within the cell.

(ii) Since the MSEBR takes historical activity into account, short-term fluctuations in channel conditions are less likely to impact the encoding bit rate that is used. For example, despite a short-term increase in the available bandwidth, the client may continue to download at a lower encoding bit rate, if history shows that a higher encoding bit rate is not sustainable. As a result, even when the available bandwidth reverts to its lower historical level, the playback of the video will not stall.

(iii) By lowering the MSEBR only if the communication channel between the base station and the client is congested, unnecessary requests for lower encoding bit rates may be avoided.

(iv) Upon a client moving to a new cell during a download, a new MSEBR, which is specific for the new cell, may be quickly applied, such that the encoding bit rate is adjusted appropriately. As described above, even if the client was not recently active in this new cell, an appropriate MSEBR may be calculated, based on the activity of other clients within the new cell.

Typically, the system is located between the radio access network (RAN) and the core network (CN) of the cellular network, such that the system may monitor all data traffic passing between the RAN and the CN. Due to this high-level view of activity in the network, the system may calculate an appropriate MSEBR for each video streaming, taking into account, as necessary, the historical and current activity of many client devices. Moreover, since all of the data traffic passes through the system, the system may further apply the MSEBR to a video download by managing the rate at which packets of the video are passed to the client, or by informing the client of the MSEBR by including the MSEBR in packets that are passed to the client.

In other embodiments, the system is located outside of the cellular network, and passively monitors the flow of communication traffic across the network. In such embodiments, the system may apply the MSEBR to the download by passing appropriate messages to the client.

In some embodiments, to periodically update the MSEBR during a given download, the system maintains, in memory, a record of any packets that were streamed to the client, along with a record of any acknowledge packets, sent by the client, acknowledging receipt of any of these streamed packets. Based on these records, the system periodically estimates the current communication bit rate (CBR) at which content is being downloaded by the client; for example, the system may estimate the number of downloaded bits that were acknowledged by the client during a particular period of time leading up to the most recent acknowledge packet. For example, if X bits were downloaded during the one second leading up to the most recent acknowledge packet, the system may estimate a current CBR of X bps. The system may then increase the client's MSEBR, if this rate X is sufficiently greater than the current MSEBR.

For example, it will be assumed that the client's MSEBR is currently 1.2 Mbps, such that—given predefined encoding bit rates of 300 kbps, 700 kbps, 1 Mbps, and 1.4 Mbps—the client is currently downloading at an encoding bit rate of 1 Mbps. In such a case, an estimated current CBR of 1.6 Mbps indicates that the client is underutilizing the available bandwidth. The system may therefore increase the client's MSEBR, by applying a weighted average of the current MSEBR (1.2 Mbps) with any suitable quantity that is based on the current CBR (1.6 Mbps), such as $\alpha$ times the current CBR, where $\alpha$ is between 0 and 1. Over time, if the communication bit rate of 1.6 Mbps persists, the system may continue to raise the MSEBR toward 1.6 Mbps, until the MSEBR reaches the next predefined encoding bit rate of 1.4 Mbps. The client will then begin downloading at an encoding bit rate of 1.4 Mbps.

The system may also ascertain the current level of congestion in the communication channel, between the base station and the client, via which the video is being downloaded, and adjust the MSEBR responsively thereto. For example, the system may ascertain the total number of bytes (or bits) that were streamed to the client, but not yet acknowledged by the client. If this quantity (or another quantity derived therefrom) is above a particular threshold for a certain duration, and particularly if this quantity is seen to be increasing over time, the system may conclude that the communication channel between the client and the base station is congested. Such a situation may indicate that the current encoding bit rate is too high. The system may therefore lower the MSEBR, by applying a weighted average of the MSEBR with the current CBR, which may be ascertained as described above. Over time, if the state of congestion persists, the system may continue to lower the MSEBR, until the MSEBR is less than the current encoding bit rate. At that point, the client will begin to download at a lower encoding bit rate.

The system may also periodically update the default MSEBR for a particular cell, by applying a weighted average of the current cell MSEBR with the respective MSEBRs of all of the clients in the cell whose communication channels are currently congested. This default MSEBR may be used for any client that begins to download video in the cell.

To apply the MSEBR to the download, e.g., by causing the download to proceed at the highest encoding bit rate that does not exceed the MSEBR, one of the following techniques may be used:

(i) The system may instruct the server to stream the video content at an appropriate rate, such that the communication bit rate does not exceed the MSEBR, and the client, therefore, does not request a higher encoding bit rate. For example, if the MSEBR is 800 kbps, the system may instruct the server to stream the video content at a streaming bit rate of approximately 800 kbps.

(ii) The system may delay packets en-route to the client, in accordance with the MSEBR. For example, if the MSEBR is 800 kbps, the system may keep the communication bit rate from exceeding 800 kbps, such that the client doesn't request an encoding bit rate that is higher than 800 kbps.

(iii) The system may periodically inform the client of the MSEBR, and the client may, in response to receiving the MSEBR, request the appropriate encoding bit rate from the server. (The client may be configured to periodically request the MSEBR from the system.) For example, in response to receiving, from the system, an MSEBR of 800 kbps, the client may request an encoding bit rate of 700 kbps. (In some embodiments, the system informs the client of the MSEBR by adding the MSEBR to a packet sent from the server to the client; typically, however, the system sends the MSEBR to the client in a separate message.)

(iv) The system may periodically inform the server of the MSEBR, such as by including the MSEBR in an acknowledge message (e.g., within the Transmission Control Protocol (TCP) options of the message) sent to the server. In response to receiving the MSEBR, the server may select the appropriate encoding bit rate for download, ignoring any request from the client for a higher encoding bit rate. For example, in response to receiving an MSEBR of 800 kbps, the server may select the highest pre-defined encoding bit rate that does not exceed 800 kbps, such as 700 kbps.

The first and second techniques delineated above apply the MSEBR by limiting the rate at which video content is downloaded by the client. When performing such techniques, it may be necessary, on occasion, to "test" the communication channel, in order to ascertain if a higher encoding bit rate is achievable. Hence, typically, the system, at various intervals (e.g., periodically), causes the video content to be streamed from the server, or released from the processor, at a rate that exceeds the MSEBR. After each such test, the system may increase the MSEBR (and hence, the encoding bit rate), if the client successfully downloads the content at a sufficiently high rate.

The techniques described herein may be applied to any suitable ABR protocol, including, for example, HTTP Live Streaming (HLS), Dynamic Adaptive Streaming over HTTP (DASH), Adobe HTTP Dynamic Streaming, Microsoft Smooth Streaming, or any proprietary ABR protocol used by any given content provider. Although the present disclosure relates mainly to the downloading of video, it is noted that the techniques described herein may also be applied to the downloading of any other type of content, such as audio content, in which packets of data are streamed at a variable rate of encoding.

System Description

Reference is initially made to FIG. 1, which is a schematic illustration of a system 20 for managing the downloading of video content over a cellular network, in accordance with some embodiments of the present invention.

FIG. 1 depicts a plurality of users 30 downloading video content over a UMTS network, which includes a RAN 26 and a CN 36. RAN 26 includes one or more base stations 28, which may also be referred to "Node Bs," and a radio network controller (RNC) 34, which manages the flow of communication traffic to and from base stations 28. Users 30 use respective client devices 32, which may also be referred to as "User Equipment (UE)" or simply as "clients," to download and consume content, which is provided by one or more content-delivery servers 38. Each client 32 is serviced by the base station serving the cell in which the client is located.

Typically, system 20 resides between RAN 26 and CN 36, such that all data packets exchanged between the RAN and the CN pass through the system. In such embodiments, the system may delay packets en-route to the RAN, and/or may modify packets exchanged between the RAN and the CN, as described above. In other embodiments, system 20 resides outside of the cellular network, and passively monitors the communication of data over the network, by receiving copies of each data packet from a network tap situated between the RAN and the CN.

System 20 comprises a network interface, such as a network interface controller (NIC) 22, and a processor 24. Each data packet (or a copy thereof, in passive-monitoring embodiments) is received by processor 24, via NIC 22. From the "control plane" signaling packets, the processor ascertains the respective locations of clients 32. For example, the processor may ascertain, based on a particular signaling packet, that a particular client has entered a new cell. The processor associates this information with the "data plane" (or "user plane") packets, such as to monitor and manage the downloading of video content as described herein. For example, further to ascertaining, from a signaling packet, that a particular client has entered a new cell, the processor may identify that a particular downlink data-plane packet is destined for the client, based on a common ID (such as a tunnel ID) and/or IP address appearing in both the signaling packet and the downlink data-plane packet.

Further to receiving an uplink or downlink data-plane packet, the processor may record information from the packet, as further described below with reference to FIG. 2. (For example, the processor may record the number of bytes in a downlink data-plane packet.) The processor may further ascertain the type of content that the packet contains, and delay or modify the packet responsively thereto. For example, if a downlink data-plane packet contains video content destined for the client, the processor may delay the packet before passing the packet to the RAN, in order to facilitate achieving a desired download rate. In general, the processor may use any suitable technique for identifying the type of content that a particular data-plane packet contains, such as any of the techniques described in U.S. Pat. No. 9,521,060, whose disclosure is incorporated herein by reference. For example, in the event that a particular data-plane packet is encrypted, the processor may deduce the type of content that the data-plane packet contains, based on Domain Name System (DNS) messages received prior to receiving the packet.

Notwithstanding the particular type of cellular network shown, it is noted that system 20 may be used to manage the downloading of video content over any type of cellular network, such as, for example, an LTE network.

Processor 24 may be embodied as a single processor, or as a cooperatively networked or clustered set of processors. In some embodiments, processor 24 is implemented solely in hardware, e.g., using one or more field-programmable gate arrays (FPGAs). In other embodiments, processor 24 is at least partly implemented in software. For example, processor 24 may be a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the processor in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

In some embodiments, processor 24 is implemented on a virtualized platform, e.g., using network functions virtualization (NFV).

Calculating the Maximum Sustainable Encoding Bit Rate

Figure 2:
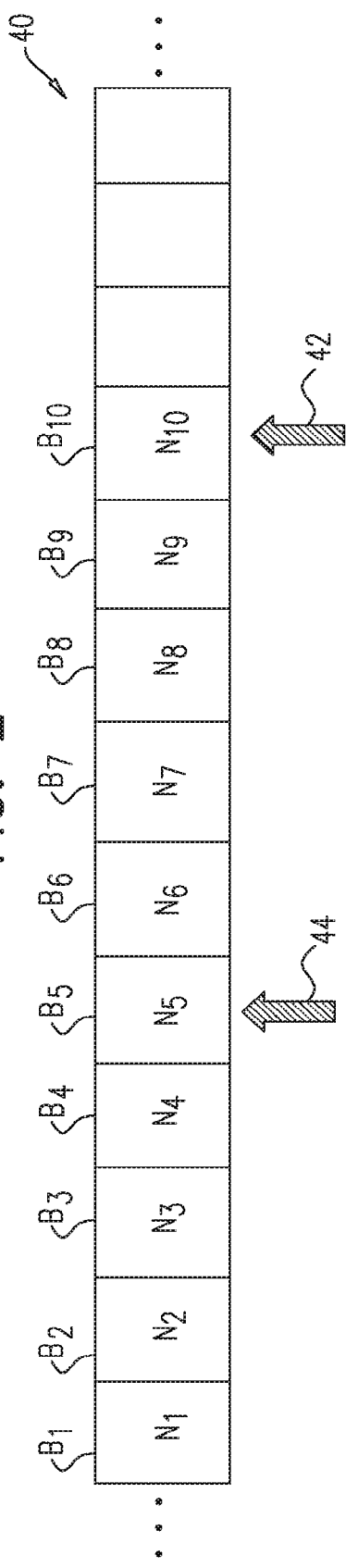
FIG. 2 is a schematic illustration of a cyclic array maintained by a processor for a particular client and a particular base station in a cellular network, in accordance with some embodiments of the present invention.

Reference is now made to FIG. 2, which is a schematic illustration of a cyclic array 40 maintained by processor 24 for a particular client and a particular base station in a cellular network, in accordance with some embodiments of the present invention. (In general, the processor may maintain a separate instance of array 40 for each client-base-station pair in the cellular network.)

Array 40 includes a plurality of buckets $\{B_i\}$, corresponding to successive intervals of time, which are typically of equal duration T. (For example, T may be 8 ms, such that the buckets correspond to successive intervals of 8 ms.) Each bucket typically contains a number $N_i$ of bytes of streamed content destined for the client, via the base station, that were received by the processor during the interval of time to which the bucket corresponds. Such content may include video content from a video server, and/or other content. FIG. 2 explicitly labels ten such buckets $B_1 \ldots B_{10}$, and shows, within these ten buckets, respectively, numbers $N_1 \ldots N_{10}$ of bytes. (To avoid any confusion, it is noted that only numbers of bytes—not the bytes themselves—are stored within the buckets.)

A first pointer 42 points to the current bucket, corresponding to the current time interval. For each packet (belonging to a video stream, or any other stream) destined for the client that is received by the processor during this time interval, the processor records, in the bucket, an identifier of the packet, such as the TCP sequence number and 4-tuple of the packet, and increments the number of bytes in the bucket by the number of bytes in the packet. Subsequently, at the end of the time interval, first pointer 42 is moved to the next bucket. The next bucket is then reset, i.e., any packet identifiers are removed from the bucket, and the number of bytes in the bucket is set to zero. Subsequently, as packets continue to arrive, the processor records the respective identifiers of these packets within this next bucket, and updates the number of bytes in this next bucket. In this manner, first pointer 42 continues to cycle through array 40.

For example, between 9:00:00:000 and 9:00:00:008, first pointer 42 may point to bucket $B_9$, such that the processor records, in bucket $B_9$, the number $N_9$ of bytes received between 9:00:00:000 and 9:00:00:008. Subsequently, between 9:00:00:008 and 9:00:00:016, first pointer 42 may point to bucket $B_{10}$, such that the processor records, in bucket $B_{10}$, the number $N_{10}$ of bytes received between 9:00:00:008 and 9:00:00:016.

In addition to receiving streamed packets destined for the client, the processor receives, from the client, acknowledge packets, which the client sends in response to receiving the streamed packets. Based on these acknowledge packets, the processor maintains a second pointer 44, which points to the bucket within array 40 that contains the most-recently acknowledged packet. In particular, upon receiving each acknowledge packet, the processor identifies the packet identifier specified by the acknowledge packet, and then locates this identifier in one of the buckets in array 40. The processor then updates second pointer 44 to point to this bucket.

Based on first pointer 42 and second pointer 44, the processor may estimate two important quantities, which facilitate updating the maximum sustainable encoding bit rate (MSEBR):

(i) First, the processor may estimate the number of bytes of streamed content (including any video content) destined for the client, via the base station, that were not yet received by the client. Since, typically, any congestion in the RAN is due almost completely to congestion between the base station and the client, the number of unreceived bytes generally indicates the level of congestion in the communication channel between the base station and the client.

To estimate the number of unreceived bytes, the processor typically ascertains the number of bytes that were not yet acknowledged by the client, by counting the total number of bytes between the first and second pointers. (This technique assumes that, generally speaking, any unacknowledged packets were not yet received by the client.) For example, in the example shown in FIG. 2, the processor may estimate the number of bytes of unreceived content as $N_U = \Sigma_{i=6}^{i=10} N_i$. The processor may then compare a quantity based on $N_U$, such as $N_U$ itself or another quantity derived from $N_U$, to a threshold. If the quantity remains greater than the threshold over a particular period of time, the processor may identify a state of congestion in the communication channel between the base station and the client.

(In the context of the present application, including the claims, a "state of congestion" refers to a state in which, over a suitable period of time as described above, the estimated amount of data within the communication channel, and/or a quantity derived therefrom, is greater than a threshold. For simplicity, the description below may refer to the client as being "congested," if the communication channel between the base station and the client is congested.)

Typically, upon identifying a state of congestion, the processor updates the MSEBR. In most cases, the processor lowers the MSEBR; sometimes, however, the processor may raise the MSEBR, as described below with reference to FIG. 3.

For example, to identify a state of congestion, the processor may first calculate the current capacity of the base station via which the download is conducted, by estimating (e.g., as described immediately below) the respective current communication bit rate (CBR) of each client currently downloading content via the base station, and then summing these CBRs. This sum may be referred to as the "capacity" of the base station, or, alternatively, as the total bandwidth B of the base station. Subsequently, the processor may identify the number $N_C$ of active clients that are utilizing more than a given percentage (e.g., 5%) of bandwidth B. The processor may then calculate a target communication bit rate TCBR, which assumes an equal division of bandwidth B amongst the active clients, by dividing B by $N_C$ (TCBR=B/$N_C$). The processor may then divide $N_U$, the number of unreceived bytes, by TCBR, to obtain an estimated time that is required for the as-yet unreceived bytes to be received by the client. If this quantity (i.e., the quantity $N_U$/TCBR) remains greater than a threshold amount of time (e.g., 100 ms) for at least a certain period of time (e.g., 256 ms), the processor may conclude that the client is congested, and may therefore update the MSEBR.

(ii) Second, the processor may estimate the current CBR, i.e., the processor may estimate the rate at which the client is currently downloading content (including any video content), based on an estimated number of bytes of content that were received by the client during a preceding period of time (e.g., a period of one second) leading up to the time of the last-acknowledged packet, which is pointed to second pointer 44. For example, assuming that the $j^{th}$ through $k^{th}$ buckets in array 40 cover a period of one second leading up to the time of the last-acknowledged packet, the current CBR may be estimated as $8*\Sigma_{i=j}^{i=k} N_i$ bps, where the $\{N_i\}$ are in units of bytes. If this quantity exceeds the most recent (i.e., current) MSEBR by more than a threshold, the processor may update the MSEBR. For example, if the estimated current CBR is greater than $(1/\alpha)$ times the most recent MSEBR, where $\alpha$ is a scalar between 0 and 1, the processor may update the current CBR.

Typically, the processor continually (e.g., periodically, such as every 64 ms) updates the MSEBR, by calculating a weighted average of (i) the most recent MSEBR and (ii) a quantity that is based on the estimated current CBR, such as the CBR itself, or a multiple thereof. For example, the processor may calculate the new MSEBR as the sum of $\beta$*MSEBR and $(1-\beta)$*$\alpha$*CBR, where $\alpha$ is the scalar defined above, and $\beta$ is another scalar between 0 and 1.

Typically, the value of $\alpha$ is less than one (e.g., 0.8), such that, by multiplying the estimated current CBR by $\alpha<1$ for each weighted-average computation, the processor causes the MSEBR to converge to less than the estimated current CBR. This provides a margin of safety, such that a subsequent decrease in the communication rate does not cause a stalling of the playback. For example, even if a download proceeds, for some time, at a communication bit rate of approximately 1.2 Mbps, the MSEBR will not converge to 1.2 Mbps; rather, the MSEBR will converge to only $\alpha$*1.2 Mbps, such that an encoding bit rate that does not exceed $\alpha$*1.2 Mbps will be selected for the download. Furthermore, by using a value of a that is less than one, the processor allows for the downloading of other content simultaneously with the video download.

In general, $\beta$ is chosen such as to provide the desired weighting to the most recent MSEBR, which is based on historical communication bit rates at which content was downloaded (by the present client, and/or other clients) via the base station. As described above in the Overview, it may be advantageous to give a relatively large weighting to the historical communication bit rates, such as to limit the effect of short-term fluctuations in the communication bit rate. For example, $\beta$ may be 63/64, or any other suitable value that is close to one, such that the current MSEBR is given a much higher weighting than $\alpha$*CBR in the computation of the new MSEBR.

In some embodiments, the updating of the MSEBR, as described above, is implemented in computer code that is based on the following pseudocode:

```
If(client_is_congested OR estimated_current_CBR>
    (1/α)*MSEBR)

MSEBR=β*MSEBR+(1-β)
    *α*estimated_current_CBR
```

Equivalently, (1/a)*MSEBR may be defined as the "congestion rate" CR, and the processor may continually update CR, and calculate the MSEBR as $\alpha$*CR. The updating of CR may, for example, be implemented in computer code that is based on the following pseudocode, which is analogous to the pseudocode above:

```
If(client_is_congested OR
    estimated_current_CBR>CR)

CR=β*CR+(1-β)*estimated_current_CBR
```

It is noted that FIG. 2 shows only one, of many, possible implementations of the MSEBR-update process. In general, any suitable technique for computing any suitable measure of congestion, and any suitable technique for estimating the current CBR, are included within the scope of the present disclosure.

Typically, upon identifying that a given client is requesting to download video content via a given base station, the processor checks if the client recently downloaded any content via the base station. If yes, the processor may use the most recent MSEBR calculated for the client and base station. (In the event that the client recently downloaded other types of content, but not video content, the processor may derive an MSEBR from the most recent CR value.) Otherwise, the processor may apply, to the video download, a default MSEBR for the base station, which may be calculated as described below. Similarly, upon the client moving to a new cell during the download, and hence switching to the base station that covers the new cell, the processor may reinitialize the MSEBR, by applying, to the download, the default MSEBR that was calculated for the new cell. (In any case, as the download proceeds within the cell, the processor continually calculates an updated MSEBR, as described above.)

Typically, to check if the client recently downloaded content, the processor checks the time stamp of the most-recently streamed, or most-recently acknowledged, packet that was received by the processor en-route to the client. If the time indicated by this time stamp is within a threshold (e.g., seconds) of the current time, the most recent MSEBR (or an MSEBR derived from the most recent CR) is used; otherwise, the default MSEBR for the cell is used.

The default MSEBR is based on historical communication bit rates at which content was downloaded, via the base station, by any plurality of devices that recently used the base station. Typically, the processor continually (e.g., periodically, such as every 64 ms) updates the default MSEBR for each base station, by calculating a weighted average of (i) the most recent default MSEBR for the base station (which is based on the aforementioned historical communication bit rates), and (ii) a quantity that is based on current communication bit rates, and/or the aforementioned historical communication bit rates.

For example, the processor may continually calculate a weighted average of (i) the most recent default MSEBR, and (ii) the respective MSEBRs of all currently congested clients utilizing the base station. This weighted average may be implemented, for example, in computer code that is based on the following pseudocode:

For each client in cell

If(client_is_congested)

default_MSEBR=$w$*default_MSEBR+(1−$w$)*client_MSEBR

As with β, w, which is between 0 and 1, is chosen such as to provide the desired weighting to the most recent default MSEBR. Typically, the value of w is close to 1, such as, for example, 127/128.

As an alternative to the above-described weighted average, the processor may calculate a weighted average of the most recent default MSEBR with $\alpha$*TCBR, where TCBR, it will be recalled, is a target communication bit rate that assumes an equal division of bandwidth amongst the active clients. This alternative calculation may be implemented, for example, in computer code that is based on the following pseudocode:

default_MSEBR=$w$*default_MSEBR+(1−$w$)*$\alpha$*TCBR

It is noted that the techniques described herein may be used with both the TCP and User Datagram Protocol (UDP) protocols. Although UDP itself does not provide acknowledgements, higher-level protocols implemented on top of UDP, such as the Trivial File Transfer Protocol (TFTP), may provide an acknowledgement for each received packet, such that second pointer 44 may be maintained as described above.

Applying the Maximum Sustainable Encoding Bit Rate

Further to calculating the MSEBR, the processor applies the MSEBR to the video download currently in progress, i.e., the processor inhibits the client from downloading at an encoding bit rate that exceeds the MSEBR. Typically, the processor causes the client to download segments of video that are encoded at the highest predefined bit rate that does not exceed the MSEBR.

Figure 3:
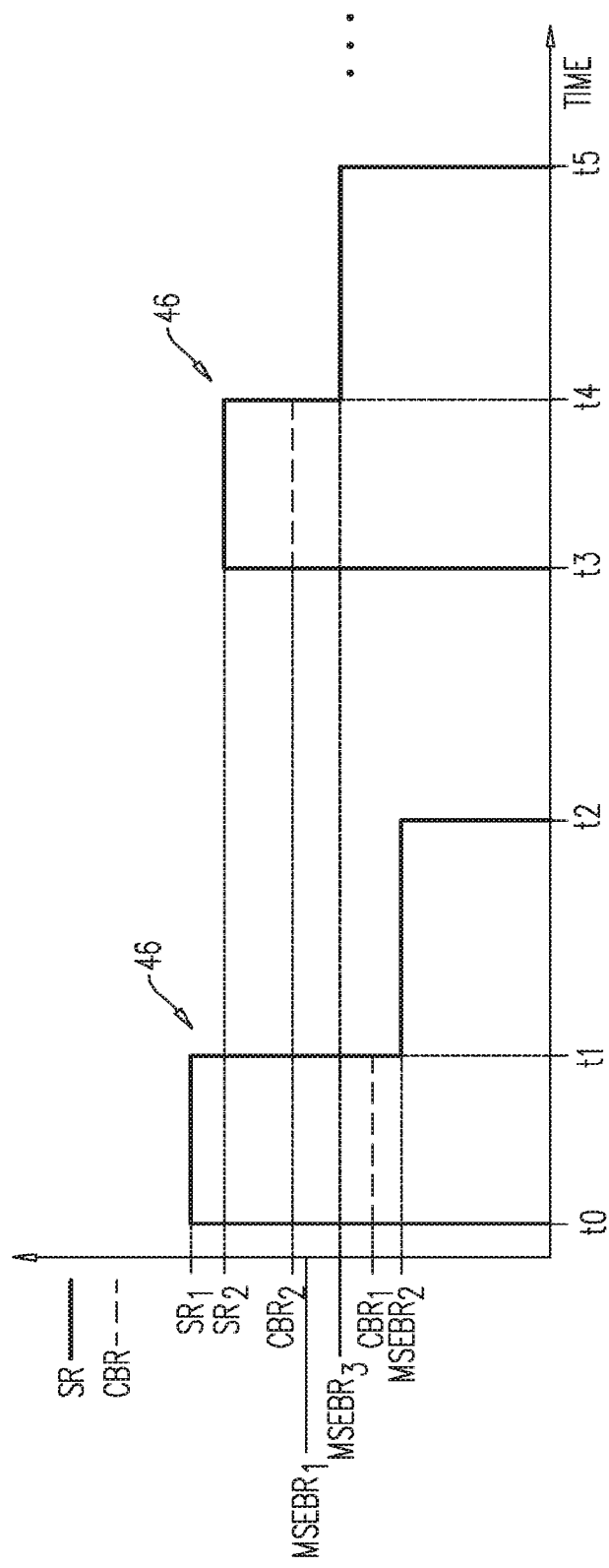
FIG. 3 is a schematic illustration of a technique for applying a maximum sustainable encoding bit rate to a video download by managing a communication bit rate of the download, in accordance with some embodiments of the present invention.

As described above in the Overview, the processor may apply the MSEBR by controlling the communication bit rate, such that the client refrains from requesting, from the server, an encoding bit rate that exceeds the MSEBR. In this regard, reference is now made to FIG. 3, which is a schematic illustration of a technique for applying an MSEBR to a video download by managing a communication bit rate of the download, in accordance with some embodiments of the present invention. FIG. 3 shows the progression of a video download over time, starting at a time t0. In the particular example shown, the video is streamed in a plurality of communication bursts 46. It is noted, however, that the principles described below with reference to FIG. 3 may also be applied to cases in which the video is streamed in a single communication burst. (For simplicity, FIG. 3 assumes that no other content, aside from the video, is being streamed to the client.)

FIG. 3 assumes that the processor manages the communication bit rate "CBR" by controlling the stream rate "SR" at which the server streams video content to the client. The SR is indicated in the figure by a solid line, while the CBR is indicated by a dashed line. Where only a solid line is shown, the CBR coincides with the SR.

At time t0, following the request from the client to begin the download, the processor causes the server to begin streaming the video to the client. Initially, the MSEBR has a value $MSEBR_1$, such that the encoding bit rate of the streamed video does not exceed $MSEBR_1$. (The initial value of $MSEBR_1$ may, for example, be the default MSEBR for the cell.) The processor, however, causes the video to be streamed, between time t0 and a time t1, at a stream rate SR' that significantly exceeds $MSEBR_1$, such that the client_is_congested, and downloads the streamed content at the maximum achievable communication bit rate $CBR_1$.

Between time t0 and time t1, responsively to the client being congested during this interval, the processor updates the MSEBR, in accordance with the rate $CBR_1$. For example, as described above, the processor may repeatedly, between time t0 and t1, calculate a weighted average of the MSEBR with $\alpha$*$CBR_1$ (e.g., 0.8*$CBR_1$) until the MSEBR converges to a new value, $MSEBR_2$, that is near, or equal to, $\alpha$*$CBR_1$. At time t1, the processor stops applying the increased stream rate, and causes the video to be streamed, between time t1 and a time t2 at which the first burst 46 ends, at a stream rate that is near, or equal to, $MSEBR_2$. By maintaining the stream rate at $MSEBR_2$, the processor caps the communication bit rate at $MSEBR_2$, such that the client does not request an encoding bit rate that is higher than $MSEBR_2$.

Subsequently, at a time t3, the second burst begins. Again, the processor causes the stream rate at the beginning of the burst, until a time t4, to have a value $SR_2$ that significantly exceeds $MSEBR_2$, such that the client becomes congested, and downloads at a maximum achievable communication bit rate $CBR_2$ that exceeds $MSEBR_2$. In response to $CBR_2$ exceeding $MSEBR_2$ by more than a threshold (e.g., in response to $CBR_2$ being greater than $(1/\alpha)$*$MSEBR_2$, such that $CBR_2$ exceeds $MSEBR_2$ by more than $((1/\alpha)-1)$*$MSEBR_2$), the processor calculates another MSEBR, $MSEBR_3$, that is greater than $MSEBR_2$. For example, the processor may repeatedly calculate a weighted average of the MSEBR with $\alpha$*$CBR_2$, until the MSEBR converges to $MSEBR_3$. The processor then applies $MSEBR_3$ to the downloading of the video, by setting the stream rate—and hence, the communication bit rate—near or equal to $MSEBR_3$, such that the client device downloads, between time t4 and a time t5, segments of the video that are encoded at the highest predefined bit rate that does not exceed $MSEBR_3$.

In this manner, the processor may continue to apply the MSEBR by controlling (in particular, capping) the communication bit rate, while continually allowing the MSEBR to be reevaluated by applying an increased stream rate—and hence, "testing" the communication channel—for a period of time. For cases in which the video is streamed in a sequence of bursts, the increased stream rate may be applied at the beginning of each burst, as shown. For other cases in which the video is streamed in a single burst, the increased stream rate may be applied at the beginning of the streaming, and then again, repeatedly, at any suitable interval(s). The respective durations of the increased-stream-rate periods may have any suitable values. The increased stream rate may, for example, be a particular multiple of the MSEBR value at the start of the increased-stream-rate period, such as 1.5 times the MSEBR value. For example, SR' may be a particular multiple of $MSEBR_1$, and $SR_2$ may be a particular multiple of $MSEBR_2$.

(It is noted that an additional advantage of the first increased-stream-rate period, at the beginning of streaming, is that the start delay to the playback of the video may be reduced.)

As noted above in the Overview, in some embodiments, rather than controlling the rate at which the video is streamed from the server, the processor controls the communication bit rate by delaying packets of the video en-route to the client. In such embodiments, the processor maintains a queue of any packets of the video received en-route to the client, and releases packets from the queue to the client, such as to achieve the desired communication bit rate (i.e., such as to achieve the desired rate of downloading by the client). To facilitate re-evaluating the MSEBR (e.g., at the beginning of each burst), the processor may release a large number of packets within a short period of time, such as to cause the client to download the packets at the maximum achievable rate. FIG. 3 generally applies to such embodiments, in that the "SR" variable plotted in FIG. 3 may represent the rate at which packets are released, by the processor, to the client. One difference, however, is that the increased-stream-rate (or "increased-release-rate") periods—and especially the increased-stream-rate period at the beginning of the first burst—may not be achievable, if the processor has not accumulated enough packets in the queue.

(It is noted that another advantage of maintaining a queue of packets of the video, as described above, is that the processor may discard any packets in the queue, in the event that the client sends the video server a request, such as a TCP reset request, to stop the current flow.)

As described above in the Overview, alternatively to controlling the communication bit rate, the processor may apply the MSEBR by informing the client of the MSEBR, such that the client requests the highest pre-defined bit rate that does exceed the MSEBR. As yet another alternative, the processor may inform the server of the MSEBR, such that the server chooses the appropriate encoding bit rate.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method comprising:
 operating a network interface to perform operations comprising:
  identifying a state of congestion in a communication channel between (i) a base station included in a cellular network and (ii) a client device that during operation downloads content, which is encoded at a plurality of different encoding bit rates, from a server via the base station and the communication channel,
  estimating a current communication bit rate at which content is being downloaded by the client device,
  calculating, responsively to the state of congestion, a maximum sustainable encoding bit rate (MSEBR) for the content as a function of the estimated current communication bit rate, and
  inhibiting the client device, in response to calculating the MSEBR, from downloading a segment of the content that is encoded at any one of the predefined bit rates that exceeds the MSEBR.

2. The method according to claim 1 further comprising:
 inhibiting the client device from downloading the segment by causing the client device to download a different segment of the content that is encoded at a highest one of the predefined bit rates that does not exceed the MSEBR.

3. The method according to claim 1 further comprising:
 identifying the state of congestion by ascertaining a number of bytes of streamed content destined for the client device that were not yet acknowledged by the client device.

4. The method according to claim 1 further comprising:
 calculating the MSEBR based on historical communication bit rates at which the content was downloaded, via the communication channel, by the client device.

5. The method according to claim 4 further comprising:
 calculating the MSEBR as a weighted average of (i) a most recent MSEBR, which is based on the historical communication bit rates, and (ii) a quantity based on an estimated current communication bit rate at which content is being downloaded by the client device.

6. The method according to claim 5 further comprising:
 estimating the current communication bit rate, based on an estimated number of bytes of content that were received by the client device during a preceding period of time.

7. The method according to claim 1, wherein the MSEBR is a first MSEBR further comprising:
 estimating, subsequently, a current communication bit rate at which content is being downloaded by the client device;
 calculating a second MSEBR, responsively to the estimated current communication bit rate exceeding the first MSEBR by more than a threshold; and
 applying the second MSEBR to the downloading of the content, by inhibiting the client device from downloading a segment of the content that is encoded at any one of the predefined bit rates that exceeds the second MSEBR.

8. The method according to claim 7 further comprising:
 causing the communication bit rate to exceed the first MSEBR by more than the threshold, by controlling the communication bit rate.

9. The method according to claim 1 further comprising:
 inhibiting the client device from downloading the segment by controlling a communication bit rate at which the client device downloads content, such that the client device refrains from requesting the segment from the server.

10. The method according to claim 9 further comprising:
 controlling the communication bit rate by:

receiving streamed packets enroute to the client device, and releasing the packets, to the client device, such as to achieve a desired communication bit rate.

11. The method according to claim 1 further comprising:
inhibiting the client device from downloading the segment by communicating the MSEBR to the client device, such that the client device refrains from requesting the segment from the server.

12. The system according to claim 1, wherein the content comprises video.

13. An apparatus, comprising:
a client device to wirelessly communicate with a base station included in a cellular network, wherein the client device is configured to download content provided by a server, wherein (i) the content is encoded at a plurality of different encoding bit rates, (ii) a system coupled to the cellular network includes a network interface and one or more processors coupled to the network interface, (iii) the network interface includes memory, and (iv) the memory includes code stored therein that when executed by the one or more processors causes the one or more processors:
to identify, via the network interface, a state of congestion in a communication channel between (i) the base station included in the cellular network and (ii) the client device that during operation downloads the content, which is encoded at the plurality of different encoding bit rates, from the server via the base station and the communication channel, to estimate a current communication bit rate at which content is being downloaded by the client device, to calculate, responsively to the state of congestion, a maximum sustainable encoding bit rate (MSEBR) for the content as a function of the estimated current communication bit rate, and to inhibit the client device, in response to calculating the MSEBR, from downloading a segment of the content that is encoded at any one of the predefined bit rates that exceeds the MSEBR.

14. The system according to claim 13, wherein when the code is executed by the processor further causes the processor to inhibit the client device from downloading the segment by causing the client device to download a different segment of the content that is encoded at a highest one of the predefined bit rates that does not exceed the MSEBR.

15. The system according to claim 13, wherein when the code is executed by the processor further causes the processor to identify the state of congestion by ascertaining a number of bytes of streamed content destined for the client device that were not yet acknowledged by the client device.

16. The system according to claim 13, wherein when the code is executed by the processor further causes the processor to calculate the MSEBR based on historical communication bit rates at which the content was downloaded, via the communication channel, by the client device.

* * * * *